(12) United States Patent
Li

(10) Patent No.: US 9,298,207 B2
(45) Date of Patent: Mar. 29, 2016

(54) TEMPERATURE CONTROL DEVICE

(75) Inventor: William Wei Li, Tianjin (CN)

(73) Assignee: GENTHERM GMBH, Odelzhausen (DE)

( * ) Notice: Subject to any disclaimer, the term of this patent is extended or adjusted under 35 U.S.C. 154(b) by 0 days.

(21) Appl. No.: 13/561,488

(22) Filed: Jul. 30, 2012

(65) Prior Publication Data

US 2013/0061603 A1    Mar. 14, 2013

(30) Foreign Application Priority Data

Sep. 14, 2011 (DE) .......... 10 2011 113 128
Sep. 15, 2011 (DE) .......... 10 2011 113 338
Dec. 26, 2011 (DE) .......... 10/2011 121 979

(51) Int. Cl.
*G05G 1/06* (2006.01)
*B60K 20/02* (2006.01)
*F16H 59/02* (2006.01)

(52) U.S. Cl.
CPC *G05G 1/06* (2013.01); *B60K 20/02* (2013.01); *F16H 59/0278* (2013.01)

(58) Field of Classification Search
CPC ....... G05G 1/06; F16H 59/0278; B60K 20/02
USPC ......... 180/315; 219/202; 165/41, 42; 62/3.61
See application file for complete search history.

(56) References Cited

U.S. PATENT DOCUMENTS

| 1,475,912 | A | 11/1923 | Williams |
|---|---|---|---|
| 1,553,461 | A | 9/1925 | Negromanti |
| 2,409,421 | A | 10/1946 | Dufault |
| 3,221,145 | A | 11/1965 | Hager |
| 3,287,684 | A | 11/1966 | Armbruster |
| 3,448,246 | A | 6/1969 | Armbruster |
| 3,500,014 | A | 3/1970 | Longo |
| 3,721,799 | A | 3/1973 | Carlstrom |
| 3,892,946 | A | 7/1975 | Rimmi |
| 4,044,221 | A | 8/1977 | Kuhn |
| 4,149,066 | A | 4/1979 | Niibe |
| 4,245,149 | A | 1/1981 | Fairlie |
| 4,247,756 | A | 1/1981 | Cucinotta et al. |
| 4,410,790 | A | 10/1983 | Berf et al. |
| 4,436,986 | A | 3/1984 | Carlson |
| 4,523,085 | A | 6/1985 | Grise |
| 4,533,821 | A | 8/1985 | Sato |
| 4,539,051 | A | 9/1985 | Hacias |
| 4,542,285 | A | 9/1985 | Grise |
| 4,626,664 | A | 12/1986 | Grise |

(Continued)

FOREIGN PATENT DOCUMENTS

| CA | 2489565 C | 12/2012 |
|---|---|---|
| DE | 3513909 | 10/1986 |

(Continued)

OTHER PUBLICATIONS

Related U.S. Appl. No. 10/715,160, filed Nov. 17, 2003, U.S. Pat No. 7,306,283.

(Continued)

*Primary Examiner* — Paul N Dickson
*Assistant Examiner* — Timothy Wilhelm
(74) *Attorney, Agent, or Firm* — The Dobrusin Law Firm, P.C.

(57) ABSTRACT

A temperature control device for a climate control loop comprising at least one handle piece.

19 Claims, 5 Drawing Sheets

(56) References Cited

U.S. PATENT DOCUMENTS

Figure 1:
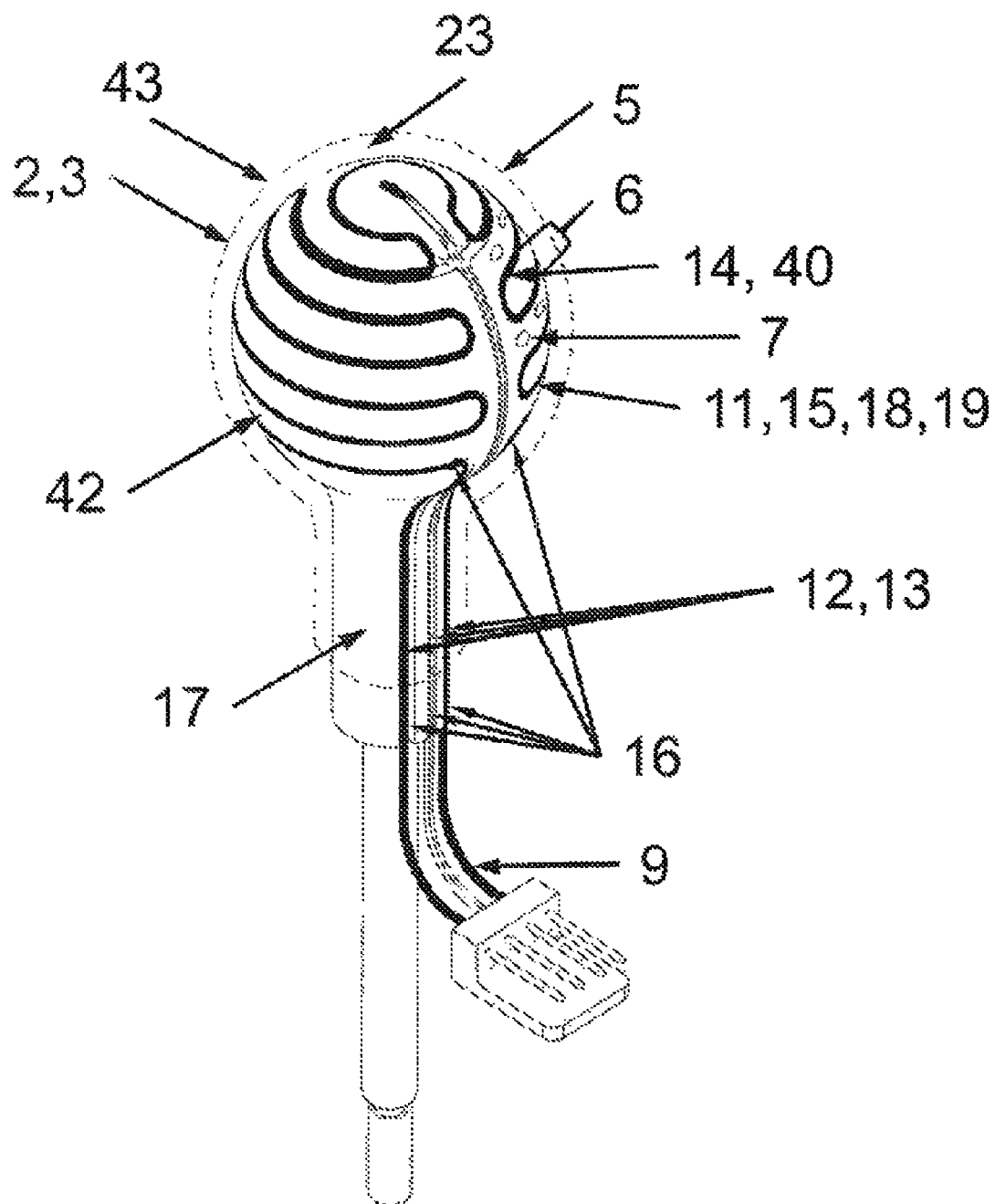

| | | | |
|---|---|---|---|
| 4,628,187 A | 12/1986 | Sekiguchi et al. | |
| 4,631,976 A * | 12/1986 | Noda et al. | 74/552 |
| 4,633,068 A | 12/1986 | Grise | |
| 4,656,339 A | 4/1987 | Grise | |
| 4,661,689 A | 4/1987 | Harrison | |
| 4,665,304 A | 5/1987 | Spencer | |
| 4,713,531 A | 12/1987 | Fennekels et al. | |
| 4,719,335 A | 1/1988 | Batliwalla et al. | |
| 4,725,717 A | 2/1988 | Harrison | |
| 4,743,741 A | 5/1988 | Ramus | |
| 4,752,672 A | 6/1988 | Grise | |
| 4,761,541 A | 8/1988 | Batliwalla et al. | |
| 4,777,351 A | 10/1988 | Batliwalla et al. | |
| 4,845,343 A | 7/1989 | Aune et al. | |
| 4,849,255 A | 7/1989 | Grise et al. | |
| 4,857,711 A | 8/1989 | Watts | |
| 4,868,898 A | 9/1989 | Seto | |
| 4,888,089 A | 12/1989 | Marstiller et al. | |
| 4,892,998 A | 1/1990 | Marstiller et al. | |
| 4,912,306 A | 3/1990 | Grise et al. | |
| 4,923,248 A | 5/1990 | Feher | |
| 4,931,627 A | 6/1990 | Watts | |
| 4,964,674 A | 10/1990 | Altmann et al. | |
| 5,015,824 A | 5/1991 | Monter et al. | |
| 5,019,797 A | 5/1991 | Marstiller et al. | |
| 5,025,136 A | 6/1991 | Doege et al. | |
| 5,034,594 A | 7/1991 | Beezhold et al. | |
| 5,045,673 A | 9/1991 | Kelly | |
| 5,057,674 A | 10/1991 | Smith-Johannsen | |
| 5,081,339 A | 1/1992 | Stine | |
| 5,111,025 A | 5/1992 | Barma et al. | |
| 5,132,840 A | 7/1992 | Okada et al. | |
| 5,155,334 A | 10/1992 | Marstiller et al. | |
| 5,181,006 A | 1/1993 | Shafe et al. | |
| 5,187,350 A | 2/1993 | Tsuchiya | |
| 5,197,595 A | 3/1993 | Coultas | |
| 5,198,639 A | 3/1993 | Smuckler | |
| 5,206,482 A | 4/1993 | Smuckler | |
| 5,335,381 A | 8/1994 | Chang | |
| 5,344,591 A | 9/1994 | Smuckler | |
| 5,354,966 A | 10/1994 | Sperbeck | |
| 5,405,178 A | 4/1995 | Weingarten et al. | |
| 5,414,241 A | 5/1995 | Oshashi et al. | |
| 5,418,025 A | 5/1995 | Harmand et al. | |
| 5,422,462 A | 6/1995 | Kishimoto | |
| 5,432,322 A | 7/1995 | Ingram et al. | |
| 5,451,747 A | 9/1995 | Sullivan et al. | |
| 5,477,033 A | 12/1995 | Bergholtz | |
| 5,516,189 A | 5/1996 | Ligeras | |
| 5,543,601 A | 8/1996 | Bartrug et al. | |
| 5,613,730 A * | 3/1997 | Buie et al. | 297/180.12 |
| 5,626,021 A | 5/1997 | Karunasiri et al. | |
| 5,643,480 A | 7/1997 | Gustavsson et al. | |
| 5,679,277 A | 10/1997 | Niibe et al. | |
| 5,702,565 A | 12/1997 | Wu et al. | |
| 5,716,536 A | 2/1998 | Yokoto et al. | |
| 5,796,044 A | 8/1998 | Cobian et al. | |
| 5,800,483 A | 9/1998 | Vought | |
| 5,800,595 A | 9/1998 | Wright | |
| 5,801,914 A | 9/1998 | Thrash | |
| 5,824,993 A | 10/1998 | Chrysochoos et al. | |
| 5,824,994 A | 10/1998 | Noda et al. | |
| 5,824,996 A | 10/1998 | Kochman et al. | |
| 5,850,741 A * | 12/1998 | Feher | 62/3.61 |
| 5,851,588 A | 12/1998 | Uthoff, Jr. | |
| 5,861,610 A | 1/1999 | Weiss | |
| 5,897,162 A | 4/1999 | Humes et al. | |
| 5,902,505 A | 5/1999 | Finley | |
| 5,904,874 A | 5/1999 | Winter | |
| 5,921,314 A | 7/1999 | Schuller et al. | |
| 5,948,297 A | 9/1999 | Haubner et al. | |
| 5,961,869 A | 10/1999 | Irgens | |
| 6,031,214 A | 2/2000 | Bost et al. | |
| 6,054,690 A | 4/2000 | Petit et al. | |
| 6,057,530 A | 5/2000 | Gurevich | |
| 6,064,037 A | 5/2000 | Weiss et al. | |
| 6,070,115 A | 5/2000 | Oestreicher et al. | |
| 6,084,217 A | 7/2000 | Bulgajewski | |
| 6,093,910 A | 7/2000 | McClintock et al. | |
| 6,097,009 A | 8/2000 | Cole | |
| 6,111,234 A | 8/2000 | Batliwalla et al. | |
| 6,114,668 A * | 9/2000 | Ogata et al. | 219/494 |
| 6,124,577 A | 9/2000 | Fristedt | |
| 6,143,206 A | 11/2000 | Handa et al. | |
| 6,147,332 A | 11/2000 | Holmberg et al. | |
| 6,150,642 A | 11/2000 | Weiss et al. | |
| 6,164,719 A | 12/2000 | Rauh | |
| 6,189,487 B1 | 2/2001 | Owen et al. | |
| 6,194,692 B1 | 2/2001 | Oberle | |
| 6,215,111 B1 | 4/2001 | Rock et al. | |
| 6,220,659 B1 | 4/2001 | McDowell et al. | |
| 6,229,123 B1 | 5/2001 | Kochman et al. | |
| 6,278,090 B1 | 8/2001 | Fristedt et al. | |
| 6,307,188 B1 | 10/2001 | Bulgajewski | |
| 6,369,369 B2 | 4/2002 | Kochman et al. | |
| 6,415,501 B1 | 7/2002 | Schlesselman | |
| 6,423,951 B1 | 7/2002 | Elsasser | |
| 6,426,485 B1 | 7/2002 | Bulgajewski et al. | |
| 6,439,658 B1 | 8/2002 | Ganz et al. | |
| 6,452,138 B1 | 9/2002 | Kochman et al. | |
| 6,455,823 B1 | 9/2002 | Bulgajewski et al. | |
| 6,495,809 B2 | 12/2002 | Bulgajewski et al. | |
| 6,501,055 B2 | 12/2002 | Rock et al. | |
| 6,512,203 B2 | 1/2003 | Jones et al. | |
| 6,559,422 B2 | 5/2003 | Burt | |
| 6,619,736 B2 | 9/2003 | Stowe et al. | |
| 6,629,724 B2 | 10/2003 | Ekern et al. | |
| 6,664,512 B2 | 12/2003 | Horey et al. | |
| 6,664,518 B2 | 12/2003 | Fristedt | |
| 6,676,207 B2 | 1/2004 | Rauh et al. | |
| 6,686,562 B1 | 2/2004 | Weiss et al. | |
| 6,686,572 B1 * | 2/2004 | Wu | B62J 33/00 219/202 |
| 6,710,303 B1 | 3/2004 | Lorenzen | |
| 6,713,733 B2 | 3/2004 | Kochman et al. | |
| 6,727,467 B1 | 4/2004 | Hadzizukic et al. | |
| 6,838,647 B2 * | 1/2005 | Nagele | 219/549 |
| 6,840,576 B2 | 1/2005 | Ekern et al. | |
| 6,844,524 B2 * | 1/2005 | Downey et al. | 219/204 |
| 6,857,697 B2 | 2/2005 | Brennan et al. | |
| 6,872,882 B2 | 3/2005 | Fritz | |
| 6,884,965 B2 | 4/2005 | Nelson et al. | |
| 6,892,807 B2 | 5/2005 | Fristedt et al. | |
| 6,903,312 B2 * | 6/2005 | Miura et al. | 219/506 |
| 6,906,293 B2 | 6/2005 | Schmiz et al. | |
| 6,976,734 B2 | 12/2005 | Stoewe | |
| 7,019,260 B1 | 3/2006 | Degand et al. | |
| 7,036,283 B2 | 5/2006 | Halas | |
| 7,049,559 B2 | 5/2006 | Ishii et al. | |
| 7,052,091 B2 | 5/2006 | Bajic et al. | |
| 7,053,344 B1 | 5/2006 | Surjan et al. | |
| 7,083,227 B2 | 8/2006 | Brennan et al. | |
| 7,091,450 B1 * | 8/2006 | Hollander | 219/202 |
| 7,100,978 B2 | 9/2006 | Ekern et al. | |
| 7,131,689 B2 | 11/2006 | Brennan et al. | |
| 7,147,279 B2 | 12/2006 | Bevan et al. | |
| 7,168,758 B2 | 1/2007 | Bevan et al. | |
| 7,202,444 B2 | 4/2007 | Bulgajewski | |
| 7,205,510 B2 | 4/2007 | Howick | |
| 7,213,876 B2 | 5/2007 | Stoewe | |
| 7,214,906 B1 * | 5/2007 | Hansen et al. | 219/204 |
| 7,223,948 B2 | 5/2007 | Howick et al. | |
| 7,285,748 B2 | 10/2007 | Nelson et al. | |
| 7,291,814 B2 * | 11/2007 | Oishi et al. | 219/506 |
| 7,301,441 B2 | 11/2007 | Inada et al. | |
| 7,306,283 B2 | 12/2007 | Howick et al. | |
| 7,338,117 B2 | 3/2008 | Iqbal et al. | |
| 7,356,912 B2 | 4/2008 | Iqbal et al. | |
| 7,370,911 B2 | 5/2008 | Bajic et al. | |
| 7,475,938 B2 | 1/2009 | Stoewe et al. | |
| 7,478,869 B2 | 1/2009 | Lazanja et al. | |
| 7,500,536 B2 | 3/2009 | Bulgajewski et al. | |
| 7,506,938 B2 | 3/2009 | Brennan et al. | |
| 7,510,239 B2 | 3/2009 | Stowe | |

(56) References Cited

U.S. PATENT DOCUMENTS

| | | |
|---|---|---|
| 7,560,670 B2 | 7/2009 | Lorenzen et al. |
| 7,569,795 B2 | 8/2009 | Ferguson |
| 7,587,901 B2 | 9/2009 | Petrovski |
| 7,618,089 B2 | 11/2009 | Stoewe et al. |
| 7,637,569 B2 | 12/2009 | Krobok et al. |
| 7,671,299 B2 * | 3/2010 | Gifford et al. ............... 219/204 |
| 7,741,582 B2 | 6/2010 | Howick et al. |
| 2002/0117495 A1 | 8/2002 | Kochman et al. |
| 2004/0065656 A1 | 4/2004 | Inagawa et al. |
| 2005/0115956 A1 | 6/2005 | Wong |
| 2005/0242081 A1 | 11/2005 | Howick |
| 2006/0118538 A1 | 6/2006 | Jones et al. |
| 2006/0138810 A1 | 6/2006 | Knoll et al. |
| 2006/0158011 A1 | 7/2006 | Marlovits et al. |
| 2006/0180583 A1 | 8/2006 | Jones |
| 2007/0176471 A1 | 8/2007 | Knoll |
| 2009/0218855 A1 | 9/2009 | Wolas |
| 2010/0035356 A1 | 2/2010 | Shalyt et al. |
| 2010/0038356 A1 | 2/2010 | Fukuda et al. |
| 2010/0038357 A1 | 2/2010 | Fukuda et al. |
| 2010/0219664 A1 | 9/2010 | Howick et al. |
| 2010/0326976 A1 | 12/2010 | Nakajima et al. |
| 2011/0049131 A1 | 3/2011 | Sturgess |
| 2011/0226751 A1 | 9/2011 | Lazanja et al. |
| 2011/0290775 A1 | 12/2011 | Cubon et al. |

FOREIGN PATENT DOCUMENTS

| | | |
|---|---|---|
| DE | 3938951 A1 | 5/1990 |
| DE | 10027173 A1 | 12/2001 |
| EP | 0202896 A2 | 5/1986 |
| GB | 2010650 A | 6/1979 |
| JP | 56093284 A | 7/1981 |
| JP | 57134655 A | 8/1982 |
| JP | 62109385 A | 7/1987 |
| JP | 11-24493 A | 1/1999 |
| JP | 2000333781 A | 12/2000 |
| JP | 2002050459 A | 2/2002 |
| WO | 8906480 A1 | 7/1989 |
| WO | 94/09684 A1 | 5/1994 |
| WO | 01/53507 A1 | 6/2001 |
| WO | 03/101777 | 12/2003 |
| WO | 2004055219 A | 2/2004 |
| WO | 2005/047056 | 5/2005 |
| WO | 2010/065411 A1 | 6/2010 |

OTHER PUBLICATIONS

Related U.S. Appl. No. 11/923,091, filed Oct. 24, 2007, U.S. Pat No. 7,741,582.

Related U.S. Appl. No. 12/778,238, filed May 12, 2010, published as 2010/0219664.

Related U.S. Appl. No. 10/356,067, filed Jan. 1, 2003, U.S. Pat. No. 6,727,467.

Related U.S. Appl. No. 11/295,875, filed Dec. 7, 2005 Published as 2006/0118538.

Related U.S. Appl. No. 11/346,969, filed Feb. 3, 2006, Published as 2006/0180583.

* cited by examiner

TEMPERATURE CONTROL DEVICE

CLAIM OF PRIORITY

The present application claims the benefit of the priority of the filing dates of German Applications. DE 102011113128.4, filed on Sep. 14, 2011; DE 102011113338.4, filed on Sep. 15, 2011; and DE 102011121979.3, filed on Dec. 26, 2011, the contents of which are hereby incorporated by reference in their entirety.

BACKGROUND OF THE INVENTION

The present teachings relate to a temperature control device and particularly a temperature control device comprising at least one handle piece.

SUMMARY

The present teachings include a temperature control device for a climate control loop comprising: at least one handle piece.

The present teachings include a temperature control device including at least one handle piece, wherein the handle piece comprises: at least one support with at least one fastening recess that at least partially accommodates at least one heating device, one cooling device, or parts thereof.

FIGURES

The description below and the claims explain details of the invention. These explanations are meant to make the invention comprehensible. However, they are only of an exemplary nature. Individual or several characteristics of the invention may of course be omitted, modified, or supplemented within the scope of the invention as defined in the claims. In addition, characteristics of various embodiments can be combined. If a characteristic has to be at least partially met, this includes that this characteristic is also fully or substantially fully met. It is decisive that implementation results to a recognizable extent in the desired benefit, for example in that a respective characteristic is 50%, 90%, 95%, or 99% met. Where a minimum quantity is specified, more than this minimum quantity may be used, of course. What is described for one object can be applied to most or all other objects of the same type. Unless otherwise specified, intervals include their peripheral points.

Figure 2:
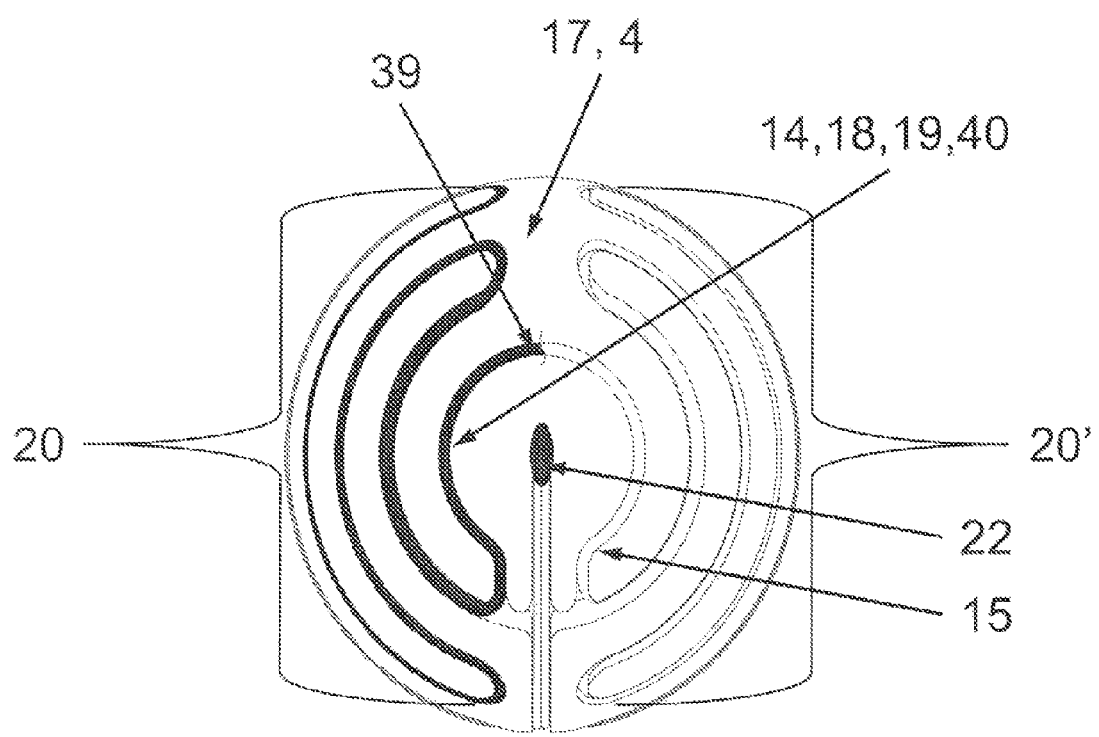
Figure 3:
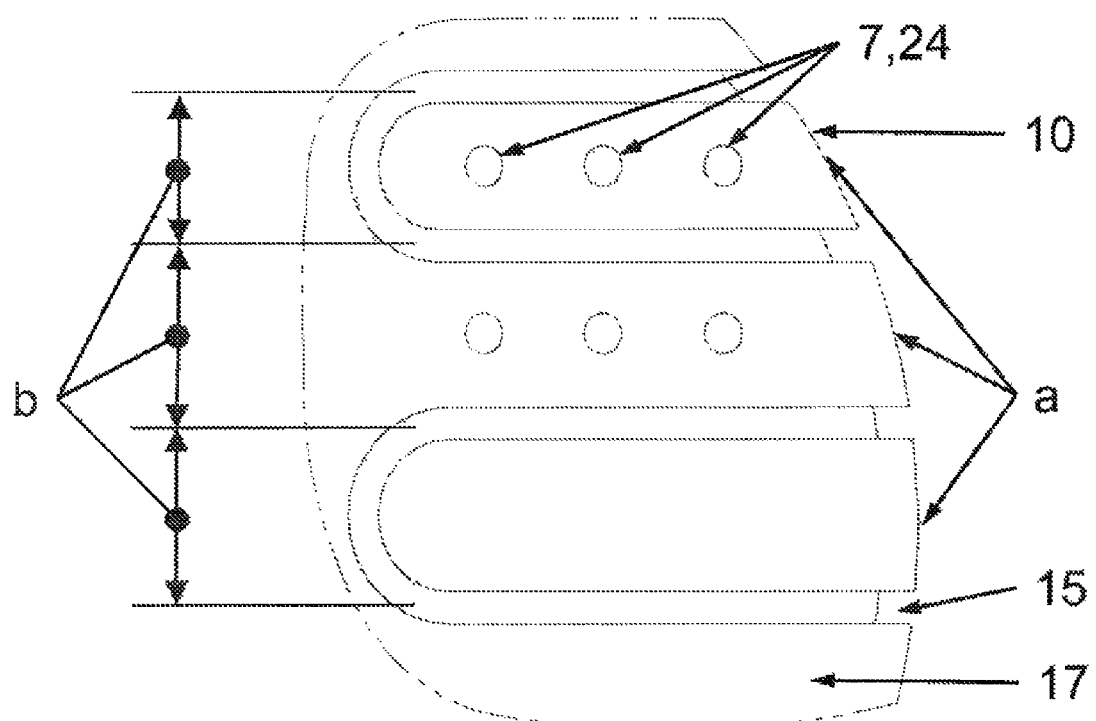
Figure 4:
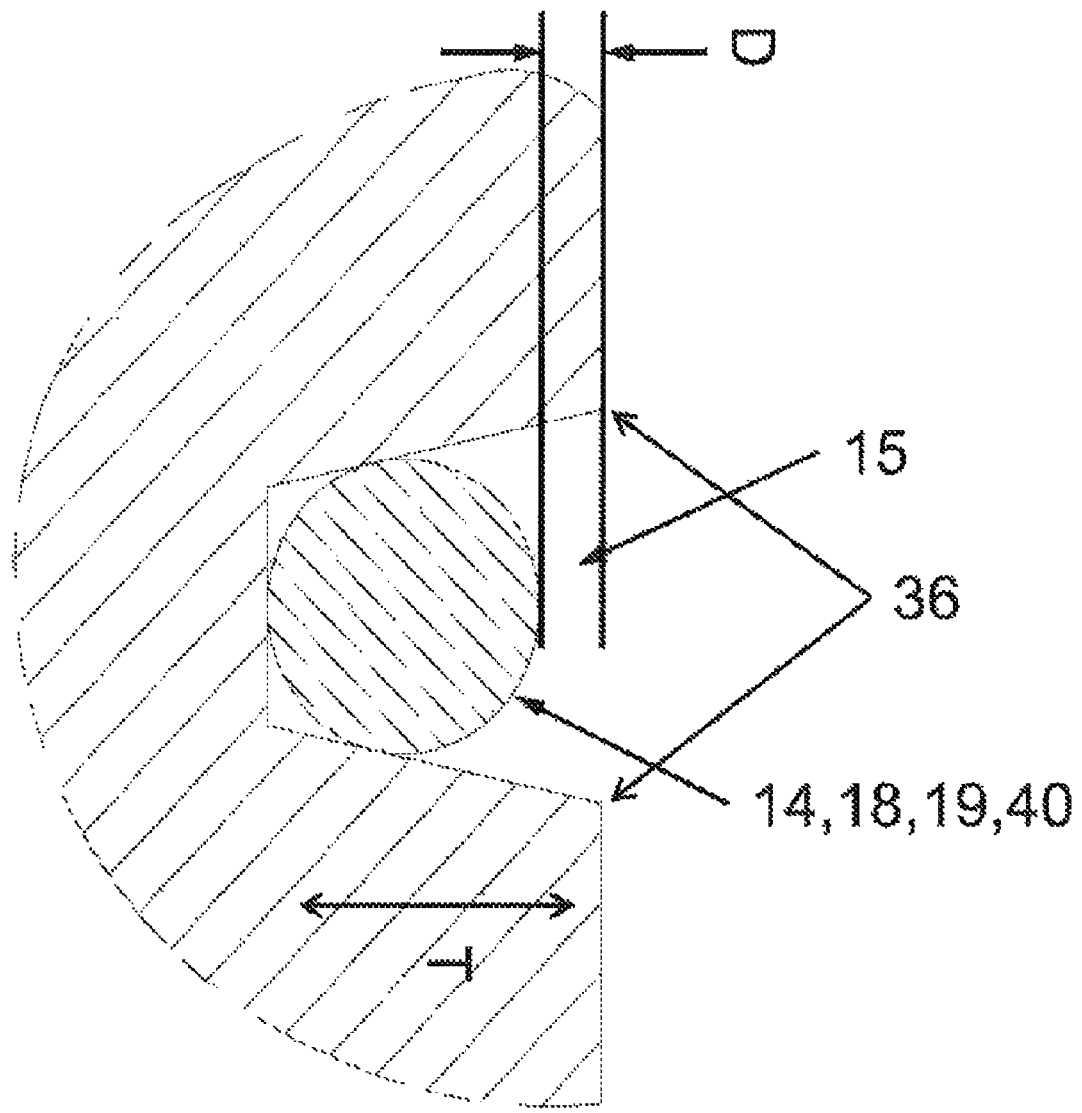
Figure 5:
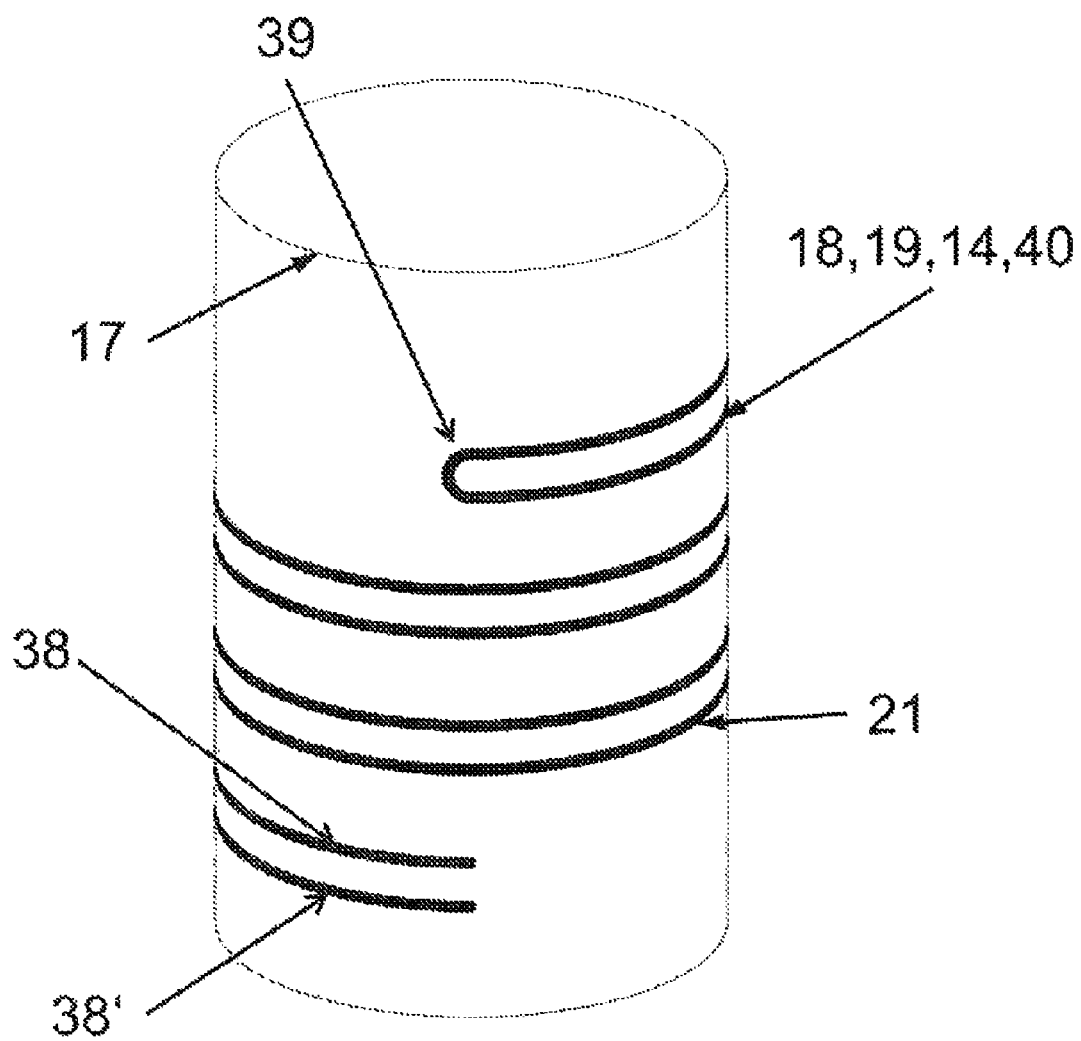

The following figures are referenced below:

FIG. 1 First embodiment of the invention in the form of a gear knob of a gear shifting system;

FIG. 2 Top view of the gear know without the cover layer;

FIG. 3 Enlarged detail of the gear knob shown in FIG. 1;

FIG. 4 Enlarged cross section through a surface area of the gear knob and a heating conductor; and FIG. 5 Second embodiment of the invention.

DESCRIPTION

The present invention relates to a vehicle. The term "vehicle" specifically means an apparatus for transporting people and/or goods. Conceivable are land, water, rail, and air vehicles, especially aircraft, vessels, and motor cars.

The invention further relates to a climate control loop 2 (FIG. 1). The term "climate control loop" includes in particular an object that is to be influenced with respect to at least one climatic parameter, i.e. it is subject to a control and/or closed-loop control system, especially to be kept at a specific setpoint value for a short period of time, or to be brought into a set point range and/or kept permanently in this range. This preferably applies to such parts of its surface with which a medium is intended to come into contact or with which a user can at least potentially come into contact when using the object. This may include curved surfaces, especially steering wheels, joy sticks, gear knobs, handles, or other components with a support surface for a hand.

At least one climate control loop appropriately comprises a handle piece 3. "Handle piece" includes in particular a component or a section thereof that is intended to serve as a support surface for a hand or for being held by, or enclosed in, a hand. Examples are balls, spindles, cylinders, ovals, tapers or other symmetrical or asymmetrical bulges or sections thereof.

It is preferred that a handle piece 3 comprises at least a support 4. The term "support" means in particular a device for absorbing forces that are to be transmitted via the handle piece between a hand and a technical device such as a machine, a clutch, or an anchoring. Conceivable are, for example, rods or pipes made of metal or fiber-reinforced plastic with a protrusion molded onto their end, e.g. by injection molding, or club-shaped hollow bodies composed of spoon-shaped half-shells.

It is preferred that at least one support 4 consists at least in part of a material that ensures thermal and mechanical stability. Polyurethane, polyethylene, or polyamide, especially PA 66, especially mixed with reinforcing fibers, e.g. of glass or carbon, are particularly suitable.

Favorably, at least one support 4 comprises at least partially sufficient heat conductivity to conduct heat from a temperature control device 11 to a surface to be temperature controlled.

It is useful that at least one support 4 comprises at least in part a shape that results in good thermal contact between the support 4 and a temperature control device. A good conductive heat transition between the temperature control device 11 and the support 4 is achieved in that the temperature control device 11 is fastened onto the support under tensile stress. Spherical, oval, elliptical or otherwise thickened sections can be used for this purpose. These sections may also be cylindrical, spindle-shaped, symmetrical or asymmetrical.

Advantageously, at least one support 4 is at least partially shaped in such a way that it allows safe and, at least in the zone to be temperature controlled, substantially adhesive-free fastening of a temperature control device 11 on a support 4. This allows for savings in material costs, improves environmental friendliness and prevents dosing and spreading problems of the adhesive on three-dimensional surfaces. Spherical, oval, elliptical, or surfaces otherwise curved towards the zone to be temperature-controlled are favorable. The purpose is a fixation in that lifting the temperature control device 11 from a support-4 in a first section, due to the curved surface, results in all the firmer pressing on of the temperature control device 11 in a second section.

It is advisable that a handle piece 3 comprises at least one cover layer 5. The term "cover layer" particularly includes a device that partially covers a support 4, e.g. to change the appearance or haptics of the handle piece, to insulate energized parts in the handle, to distribute heat flows along a surface and/or to fixate components in the handle.

It is preferred that at least one cover layer 5 is at least partially made of a material that causes electrical insulation, a padding, at least partial electrical insulation and/or at least partially good thermal conductivity. Conceivable are, for example, leather, metal, wood, rubber, thermoplastic, polymer, and/or other synthetic materials.

It is useful that at least one cover layer 5 is at least partially made of a material that allows visibility of functional elements contained in the handle. Colorless transparent synthetic materials are particularly suitable.

A cover layer 5 favorably comprises a thickness of 0.1-8 mm, preferably 1-5 mm, and more preferably 2-4 mm.

It is preferred that a support 4 has at least partially a higher softening and/or decomposition temperature than the cover layer 5. This allows a potential later thermal application of a cover layer. Conceivable are materials with a temperature stability up to at least 250° C., for example.

Another object of this invention is an air-conditioning device 6. "Air-conditioning device" particularly means an object that is suitable to influence the climate control loop with respect to at least one climatic parameter, especially to keep it at a specific setpoint value for a short period of time, or to bring it into a setpoint range and/or keep it permanently in this range. This allows temperature-control, ventilation, humidifying or dehumidifying, and/or air-conditioning of a user even during a longer stay near the climate control loop. Conceivable are applications for temperature control or air-conditioning of a hand rest surface during longer car rides.

At least one air-conditioning device 6 favorably comprises at least one ventilation device 7. The term "ventilation device" especially refers to a device that can be used for targeted modification of the air composition or air flows in a specific area or room, such as an on-board AC system, at least partially air-permeating spacer media, spacer fabrics, and/or air-conditioning inserts. This allows ventilation of at least one climate control loop, such as the surface of an object, especially for dehumidification or temperature control of surfaces of a climate control loop located near people or touched by people. These can be applications for handles and/or gear knobs through which air flows.

Advantageously, at least one ventilation device 7 comprises at least one air delivery device. "Air delivery device" includes particularly a device to move air. Examples of such a device are axial or radial fans.

Advantageously, at least one ventilation device 7 comprises at least one air conduction device 9. The term "air conduction device" means in particular a device that conducts air delivered by an air delivery device to at least one air exchange device or in opposite direction. such as pipes or air ducts, or hollow spaces provided anyway for weight reduction in oblong components.

Advantageously, at least one ventilation device 7 comprises at least one air exchange device 10 (FIG. 3). The term "air exchange device" in particular includes a device for exchanging air between an air conduction device and a zone of a climate control loop, an environment, a climate control loop, or a hand rest in a passenger compartment to be ventilated.

It is advisable that an air-conditioning device 6 comprises at least one temperature control device 11. "Temperature control device" in particular means a device that can be used for targeted modification of the temperature in its environment. Conceivable are, for example, heating devices 14, cooling devices 40, Peltier elements, heat conducting pipes and/or an air circulation device such as a fan. It can be particularly favorable if the temperature control device is designed for operation on direct current and/or for operation at low voltage, especially for 12 V or 24 V.

At least one air-conditioning devicell favorably comprises at least one connecting line 12. The term "connecting line" refers in particular to a conductor that is used to connect an electrical device with a power source. This can be, for example, a power feeder cable for a heating resistor or a connecting cable for a temperature sensor integrated into a knob. Connecting lines are preferably conducted in the interior of a gear knob or an oblong hollow space.

It is useful that a temperature control device 11 comprises at least one heating device 14, for example, with at least one electrical heating resistor and/or a Peltier element.

At least one temperature control device usefully is at least partially in a position that results in low thermal insulation with respect to a zone to be temperature controlled. This ensures low energy consumption and fast action of the heating system. Positions underneath a cover layer are particularly suitable.

Advantageously, at least one temperature control device 11 comprises at least one fastening recess 15 (FIG. 4). "Fastening recess" refers in particular to a recess used to receive at least one functional element such as a conductor, especially a heating resistor, or at least sections thereof and/or to fasten the same in at least one direction of movement to prevent it from being shifted from its position or to stabilize it. Conceivable are, for example, oblong grooves for lowering a heating resistor into the support 4. This provides secure fastening and at the same time efficient heating.

A fastening recess 15 advantageously comprises at least one arrangement that simplifies the running of heating conductors in that is has substantially straight sections. for example.

A fastening recess 15 usefully comprises at least partially an arrangement that prevents or minimizes the emission of electromagnetic radiation. Examples include conductor sections running next to one another, at least sections of which preferably in parallel, which are passed through by currents flowing in opposite directions, such as two helical coils that extend at an offset along their longitudinal axis and are electrically connected to one another at one of their respective ends (FIG. 5). Fastening recesses or sections of fastening recesses arranged in mirror symmetry (FIGS. 1 and 2) are particularly suitable. This prevents a coil-shaped arrangement of a conductor and thus amplification of electromagnetic fields.

At least one fastening recess 15 preferably has an even depth along its entire length, e.g. between 1 and 5 mm in depth. The temperature control device thus remains equidistant to the surface of the control loop. The purpose is homogeneous heating.

A fastening recess 15 favorably comprises an at least partial 0.5° incline on one or several of its sides to allow easy removal of the support 4 from an injection mold.

Advantageously, at least one fastening recess 15 comprises at least partially even distances a between at least three straight fastening recess sections at the surface, even though this results in uneven distances b along the longitudinal axis of the gear knob.

It is useful that a fastening recess 15 at least partially has a shape that is longer at its top edge than at its bottom. This allows adhesive-free, secure fastening of conductor strands, especially on curved surfaces, to prevent detachment of the conductors. A strand conducted under tension in the fastening recess cannot slide out because typical strands do not allow stretching. A preferred embodiment results if at least two fastening recesses are interconnected by a transverse connection. Conceivable are. for example, slits or fastening recesses in a supporting protrusion.

A fastening recess 15 preferably has a shape that allows easy manufacture of turns. This can be achieved, for example, by arranging one or several oblong fastening recesses in at least partially helical arrangement around a heat resistor carrier. It can be advisable that a fastening recess wraps spirally around at least a partial section of a heat resistor carrier to receive a conductor strand wound continually around the heating conductor.

It is advisable that at least one temperature control device comprises an adhesive fastening 16. The designation "adhesive fastening" refers in particular to a cohesive joint, especially by gluing.

At least one adhesive fastening 16 consisting at least partially of a material that causes durable adhesion of a temperature control device to a support is recommended.

It is useful that at least one adhesive fastening 16 is at least partially in a position that entails fastening of a temperature control device 11 in a marginal area of zones where a support 4 comprises a bulge, the convex portion of which with respect to the support is on the same side as the temperature control device. Examples include contact points between heating conductors and connection leads, rims of a knob and/or zones located on the margin of a cover layer 5. Such an arrangement provides strain relief for cables, seals the fastening recesses against lateral leakage of injection mold material when the cover layer is applied to the support, and prevents detachment of conductor ends.

At least one heating device 14 favorably comprises at least one heating resistor carrier 17. "Heating resistor carrier" includes in particular a device for mechanical relief of a heating resistor and/or for fixating its spatial position. Conceivable are, for example, the control loop 2 itself, the support 4 or a part of its surface.

It is desirable that at least one heating resistor carrier 17 is at least partially made of a material that causes good castability, cost savings, and/or thermal conductivity. Polymers, especially polyamide, polyester, polyurethane, or polycarbonate are particularly suitable.

At least one heating device 14 favorably comprises at least one heating resistor 18. The term "heating resistor" specifically refers to an electrical resistor wherein the thermal energy it dissipates when energized is used directly or indirectly for heating a climate control loop. Conceivable are, for example, single or multi-conductor strands 13 the individual strands of which are at least partially insulated from one another, such as enamelled stranded wires with a copper and/or steel content.

It is useful that at least one heating resistor 18 as shown in FIGS. 1 and 2 is at least partially arranged in mirror symmetry relative to at least one plane, preferably a plane that includes the longitudinal axis of a handle piece or gear knob. This allows compensation of electromagnetic fields and/or easy manufacturing. Potential embodiments include mirror-symmetrical arrangements of resistors on the right and left side of a gear know relative to the direction of travel of the vehicle. Two heating resistors could also be arranged symmetrically to one another on the gear knob.

It is useful that at least one heating resistor 18 consists at least partially of an electrically conductive material. Examples include insulated or non-insulated stranded wires or cured conductive paste.

It is useful that at least one heating device comprises at least one temperature control strand 19. The term "temperature control strand" specifically includes a stranded component for the introduction or removal of heat along a strand, especially a stranded heating wire or a heat conduction tube. "Heat conduction tube" denotes a tube-shaped component in which a fluid can efficiently transport heat by evaporation.

A temperature control strand 19 favorably comprises a diameter of 0.05 to 10 mm, especially 0.1 to 4 mm, especially 1 to 2 mm.

It is useful that at least one temperature control strand 19 is in a position that results in efficient heating up of air flowing past and/or of a hand rest surface. Conducting along layers along a surface to be heated or windings around a duct are favorable.

Advantageously, at least one temperature control strand 19 at least partially comprises a diameter that causes clamping of the heating conductor into a fastening recess 15 if it is placed inside the fastening recess 15. Diameters that are greater than the width of the fastening recess at its deepest point but preferably smaller than the width of the fastening recess between its upper edges 36 are particularly suitable. Stranded wire can be fastened by increased friction.

It is useful that at least one temperature control strand 19 at least partially comprises a surface with a roughness that makes slipping of the heating conductor in the fastening recess 15 difficult. Conceivable are, for example, rubber-containing coatings. twisting of the conductors, or a material finish that increases surface roughness.

It is preferred that at least one temperature control strand 19 at least partially has a diameter that causes a spacing of the heating conductor from the surface of the control loop. This allows even indirect heating and prevents hot spots on the surface of the control loop 2. Suitable are diameters smaller than the depth T of a fastening recess so that a distance d, such as 0.2 mm, remains between the heating conductor and the surface. The purpose is to prevent local overheating, especially where no cover layer of a cast material is provided, for example for thin leather covers.

Advantageously, at least one heating device 14 comprises at least one heating area 20, 20'. The term "heating area" refers in particular to a partial section of a surface to be temperature controlled.

In some cases, it can be useful to provide a heating area 20, resulting in dividing a tube-shaped closed area into individual strips along the longitudinal axis of the tube. This prevents electromagnetic fields that emerge as a result of inadvertent coil formation. It is preferred, if required, to provide two or more heating areas that are not electrically connected on their longitudinal sides or are in electrical contact at a few points only. They are preferably interconnected only via their electrical supply lines and/or a point of reversal 39 at which the conductor loop is returned to a supply source. The temperature control strand is meandering here without encompassing a handle piece 3 by 360 degrees or more.

In some cases, a temperature control strand 19 comprises at least one turn 21. "Turn" refers in particular to a conductor loop that is at least partially wrapped around a heat resistor carrier, especially at least a 360 degree loop. This makes conducting the heat resistor easy in a rotation symmetrical, especially a cylindrical or spherical zone.

It may be required to provide such a number of turns 21 that a high heating output in a small space is achieved. For example, this number can be 2 to 200, in particular 4 to 30, in particular 5 to 15 turns per 10 cm of heating area or per handle piece. A multitude of turns may form at least two helical sections. In this way, electromagnetic fields can be compensated when a current passes in opposite direction through the helical sections 38, 38' that are arranged at an offset along their longitudinal axis. Conceivable are arrangements in which the helical sections 38, 38' are galvanically connected at one of their respective ends (FIG. 5).

At least one temperature control device 11 favorably comprises at least one sensor 22. It is used to detect the temperature and/or contact with a user.

It is favorable that at least one sensor 22 is at least partially positioned directly under the hand of a user. The peak point of the gear knob is particularly suitable.

Advantageously, at least one temperature control device 11 comprises at least one display device. It can be used to label the control loop 2 with at least a first color associated with coolness (such as blue or green) when the ventilation device is in operation. Alternatively, or in addition, it can be used to label the control loop 2 with at least a second color associated with heat (such as red, orange, or yellow) when the heating device is in operation. It is preferred that the first and/or second color differ from the basic color of the control loop 2 and/or from one another. Such a display device may comprise, for example, LEDs, glass fibers, or thermochromic fibers.

It is generally easier in terms of process engineering if temperature control strands are fastened without adhesives and without sewing or seams.

In an alternative embodiment, it is conceivable to conduct one or more contact conductors in addition to, or instead of, a heating conductor in existing or additional fastening recesses. These can be used to supply electrical consumers near the control loop 2, such as a user detection sensor.

They may also be provided to supply one or several heating resistors, e.g. of electrically conductive coatings applied to the gear knob and used for heating the knob. Contact can be made, for example, if the coating extends into the fastening recesses 15 and the contact conductors are simply laid out there.

The invention claimed is:

1. A temperature control device for a climate control loop comprising:
    at least one handle piece, wherein the at least one handle piece is part of a gear knob and comprises:
        at least one support with at least one fastening recess that at least partially accommodates at least one heating device or parts thereof; and
        a cover layer at least partially covering the at least one support;
            wherein the at least one fastening recess is one or more grooves for receiving and stabilizinstabilizing the at least one heating device or parts thereof, in the at least one handle piece;
            wherein the at least one heating device includes a temperature control strand that is inlaid close a surface of the at least one fastening recess;
            wherein the at least one fastening recess is an at least partially open groove and the temperature control strand has a diameter smaller than a depth of the one or more fastening recesses so a distance remains between the temperature control strand and a surface of the at least one handle piece to prevent local overheating; and
            wherein the at least one heating device has at least one heating resistor having an arrangement at least in parts that is in mirror symmetry with respect to a plane.

2. The temperature control device according to claim 1, wherein the at least one fastening recess is an at least partially open groove and comprises:
    a. an even depth along its entire length,
    b. an at least partial incline on one or several of its sides,
    c. a shape that is at least partially longer at its top edge than its bottom edge, or
    d. a combination thereof.

3. The temperature control device according to claim 1, wherein at least part of the heating device is inserted into a support made of a first material, and at least part of the heating device is later covered by the cover layer of a second material and is free of adhesive at an interface layer formed in this way.

4. An air conditioning device comprising: at least one temperature control device according to claim 1.

5. A handle piece comprising: at least one temperature control device according to claim 1.

6. The handle piece according to claim 5, wherein the at least one handle piece comprises at least two heating areas arranged on the handle piece, wherein the heating areas are free of electrical connection or are in electrical contact at single points only.

7. A vehicle comprising at least one handle piece according o claim 6.

8. The temperature control device according to 1, wherein the temperature control device includes at least one sensor.

9. The temperature control device according to claim 1, wherein the at least one support is at least partially curved toward an area to be temperature controlled to allow at least part of the at least one heating device to be fastened without adhesive fasteners at least in convex sections of the at least one handle piece.

10. A temperature control device comprising:
    a. a climate control loop including:
        i. at least one handle piece, wherein the at least one handle piece is part of a gear knob, comprising:
            1. at least one support having at least one fastening recess that at least partially accommodates at least one heating device;
            2. a cover layer at least partially covering the at least one support;
        wherein the at least one fastening recess is one or more at least partially open grooves for lowering the at least one heating device or parts thereof, into the at least one handle piece;
        wherein the at least one heating device or parts thereof has a diameter smaller than a depth of the at least one fastening recesses so a distance remains between the at least one heating device or parts thereof, and a surface of the climate control loop to prevent local overheating;
        wherein the at least one heating device includes at least two heating areas arranged on the at least one handle piece, the at least two heating areas being free of an electrical connection or are in electrical contact at a single point; and
        wherein the at least one support has at least partially a higher meting, softening and/or decomposition temperature than the cover layer.

11. The, temperature control device of claim 10, wherein the temperature control device includes a heating device, a coding device, Peltier elements, heat conducting pipes, an air circulation device, or a combination thereof.

12. The temperature control device of claim 10, wherein the at least one fastening recesses are arranged in mirror symmetry.

13. The temperature control device of claim 12, wherein at least part of the heating device is fastened without adhesive fasteners at least in convex sections of the handle piece.

14. The temperature control device of claim 10, wherein the at least one heating device includes at least one temperature control strands.

15. The temperature control device of claim 14, wherein the at least one temperature control strands are meandering without encompassing the handle piece by 360 degrees or more.

16. The temperature control device of claim 14, wherein the at least one temperature control strands comprise at least one turn.

17. The temperature control device of claim 14, wherein at least a portion of the at least one temperature control strands are fastened without adhesives, sewing, seams, or a combination thereof.

18. A temperature control device comprising;
  a. a climate control loop including:
    i. at least one handle piece, wherein the at least one handle piece is part of a gear knob, comprising:
      1. at least one support having at least one fastening recess that at least partially accommodates at least one heating device-or parts thereof,
        wherein the at least one fastening recess is one or more grooves for lowering the at least one heating device or parts thereof, into the at least one handle piece:
        wherein the at least one fastening recess at least partially has a shape that is longer at its top edge than at its bottom edge;
        wherein at least part of the at least one heating device is fastened without adhesive fasteners at least in convex sections of the at least one handle piece;
        wherein the at least one heating device includes at least two heating areas arranged on the at least one handle piece, the at least two heating areas being free of an electrical connection or are in electrical contact at a single point; and
      2. a temperature control strand that is inlaid close to a surface of the at least one fastening recess;
    wherein the temperature control strand has a diameter smaller than a depth of the one or more fastening recesses so a distance remains between the temperature control strand and a surface of the climate control loop to prevent local overheating.

19. The temperature control device according to claim 18, wherein the at least one fastening recess is arranged in mirror symmetry.

\* \* \* \* \*

UNITED STATES PATENT AND TRADEMARK OFFICE
CERTIFICATE OF CORRECTION

| | | |
|---|---|---|
| PATENT NO. | : 9,298,207 B2 | Page 1 of 1 |
| APPLICATION NO. | : 13/561488 | |
| DATED | : March 29, 2016 | |
| INVENTOR(S) | : William Wei Lei | |

It is certified that error appears in the above-identified patent and that said Letters Patent is hereby corrected as shown below:

On the Title Page

References Cited, Foreign Patent Documents, page 3, "WO 2004055219" should read as "JP 2004055219".

In the Claims

Column 7, Lines 41-42, "stabilizinstabilizing" should read as "stabilizing".

Column 8, Line 14, "o" should read as "to".

Column 8, Line 49, "meting" should read as "melting".

Column 8, Line 53, "coding" should read as "cooling".

Signed and Sealed this
Thirty-first Day of May, 2016

Michelle K. Lee
*Director of the United States Patent and Trademark Office*